United States Patent
Mosur et al.

(10) Patent No.: US 6,604,162 B1
(45) Date of Patent: Aug. 5, 2003

(54) SNOOP STALL REDUCTION ON A MICROPROCESSOR EXTERNAL BUS

(75) Inventors: Lokpraveen B. Mosur, Rancho Cordova, CA (US); Subramaniam Maiyuran, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 431 days.

(21) Appl. No.: 09/606,837

(22) Filed: Jun. 28, 2000

(51) Int. Cl.[7] .......................... G06F 13/42; G06F 13/00; G06F 12/00
(52) U.S. Cl. ................. 710/305; 710/107; 711/146; 711/167
(58) Field of Search .................. 710/305, 107–112; 711/146, 167

(56) References Cited

U.S. PATENT DOCUMENTS

| | | | | |
|---|---|---|---|---|
| 5,325,503 | A | * | 6/1994 | Stevens et al. ............. 711/146 |
| 5,572,703 | A | * | 11/1996 | MacWilliams et al. ..... 711/146 |
| 5,797,026 | A | | 8/1998 | Rhodehamel et al. |
| 5,802,577 | A | | 9/1998 | Bhat et al. |
| 5,991,855 | A | * | 11/1999 | Jeddeloh et al. ............. 711/146 |
| 6,041,380 | A | * | 3/2000 | LaBerge ..................... 710/306 |
| 6,052,762 | A | * | 4/2000 | Arimilli et al. ............. 711/146 |
| 6,065,101 | A | * | 5/2000 | Gilda ......................... 711/140 |
| 6,078,981 | A | | 6/2000 | Hill et al. |
| 6,112,283 | A | | 8/2000 | Neiger et al. |
| 6,115,796 | A | | 9/2000 | Hayek et al. |
| 6,202,101 | B1 | * | 3/2001 | Chin et al. ...................... 710/5 |
| 6,374,329 | B1 | * | 4/2002 | McKinney et al. .......... 711/141 |
| 6,397,297 | B1 | | 5/2002 | Sperber et al. |
| 6,397,304 | B1 | | 5/2002 | George |
| 6,460,119 | B1 | | 10/2002 | Bachand et al. |

OTHER PUBLICATIONS

Pentium Pro and Pentium II System Architecture, Second Edition, Mindshare, Inc., Tom Shanley, PC System Architecture Series, pp.: cover–xxxiv, 207–220 and 261–296.
Pentium Pro Processor System Architecture, Mindshare, Inc., Tom Shanley, PC System Architecture Series, pp.: cover–xxx, 187–200 and 241–276.

* cited by examiner

Primary Examiner—Sumati Lefkowitz
(74) Attorney, Agent, or Firm—Peter Lam

(57) ABSTRACT

A method and apparatus for reducing snoop stall on an external bus. One method of the present invention comprises retrieving an address and a transaction attribute for a bus transaction during a first of a plurality of request phase packets of the bus transaction. Then it is determined whether the bus transaction is a snoopable memory transaction or not. If the bus transaction is a snoopable memory transaction, a snoop probe is dispatched during the first request phase packet of the transaction. Snooping devices are allowed additional bus clocks to respond to the snoop probe, thereby reducing the number of snoop stalls required to be inserted during the bus transaction.

46 Claims, 7 Drawing Sheets

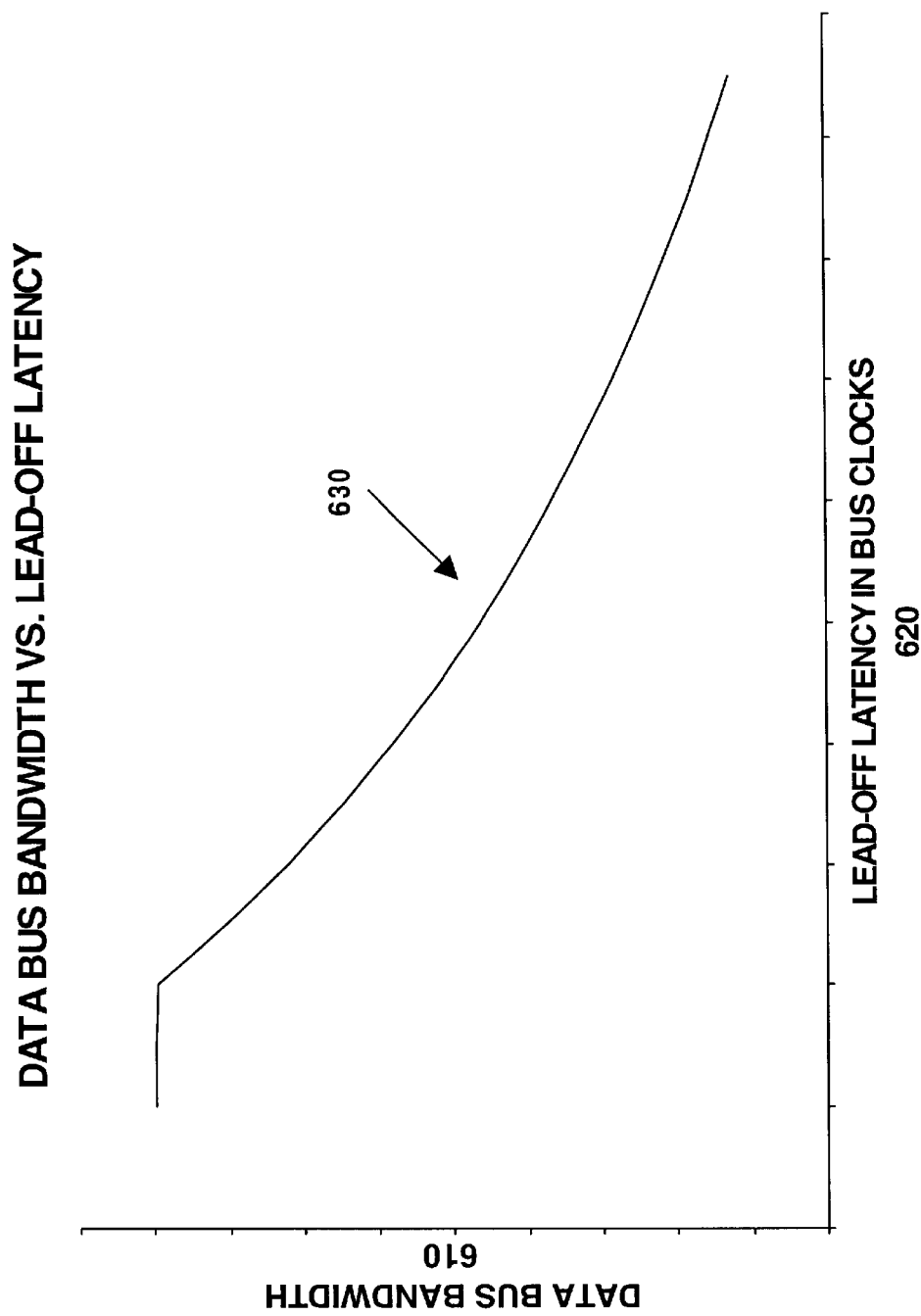

SNOOP STALL REDUCTION ON A MICROPROCESSOR EXTERNAL BUS

FIELD OF THE INVENTION

The present invention relates generally to the field of microprocessors, computers and computer systems. More particularly, the present invention relates to snoop stall reduction on a microprocessor external bus.

BACKGROUND OF THE INVENTION

Since the beginning of electronic computing, main memory access has been much slower than processor cycle times. Access time is the time between when a read is initially requested and when the desired data arrives. Processor cycle time and memory access time continues to widen with advances in semiconductor technology. Efficient mechanisms to bridge this gap are central to achieving high performance in future computer systems.

The conventional approach to bridging the gap between memory access time and processor cycle time has been to introduce a high-speed memory buffer, commonly known as a cache, between the microprocessor and main memory. Caches are ubiquitous in virtually every class of general purpose computer systems. The data stored within one cache memory is often shared among the various processors or agents which form the computer system. The main purpose of a cache memory is to provide fast access time while reducing bus and memory traffic. A cache achieves this goal by taking advantage of the principles of spatial and temporal locality.

As semiconductor technology has continued to improve, the gap between memory access time and central processing unit (CPU) cycle time has widened to the extent that there had arisen a need for a memory hierarchy which includes two or more intermediate cache levels. For example, a two-level cache memory hierarchy often provides an adequate bridge between access time and CPU cycle time such that memory latency is dramatically reduced. In these types of computer systems, the first-level (L1) cache or the highest level cache provides fast, local access to data since this cache is situated closest to the execution unit and has the smallest size. The second-level (L2) cache provides good data retention in bus and memory traffic because this cache is comparatively larger in size. The second level (L2) cache therefore takes up significant die size area and is consequently slower than the first level (L1) cache.

Main memory is typically the last or final level down in the memory hierarchy. Main memory satisfies the demands of caches and vector units, and often serves as the interface for one or more peripheral devices. Main memory usually comprises of core memory or a dedicated data storage device such as a hard disk drive unit.

One of the problems that arises in computer systems that include a plurality of caching agents and a shared data cache memory hierarchy is cache coherency. Cache coherency refers to the problem wherein, due to the use of multiple or multi-level cache memories, data may be stored in more than one location in memory. For example, if a microprocessor is the only device in a computer system that operates on data stored in memory and the cache is situated between the CPU and memory, there is little risk in the CPU using stale data. However, if other agents in the system share storage locations in the memory hierarchy, it creates an opportunity for copies of data to be inconsistent, or for other agents to read stale copies.

Cache coherency is especially problematic in computer systems that employ multiple processors as well as other caching agents. For instance, a program running on multiple processors requires that copies of the same data be located in several cache memories. Thus, the overall performance of the computer system depends upon the ability to share data in a coherent manner.

BRIEF DESCRIPTION OF THE DRAWINGS

The present invention is illustrated by way of example and not limitations in the figures of the accompanying drawings, in which like references indicate similar elements, and in which:

FIG. 6 is a graph illustrating data bus bandwidth versus lead-off latency.

DETAILED DESCRIPTION

Figure 1:
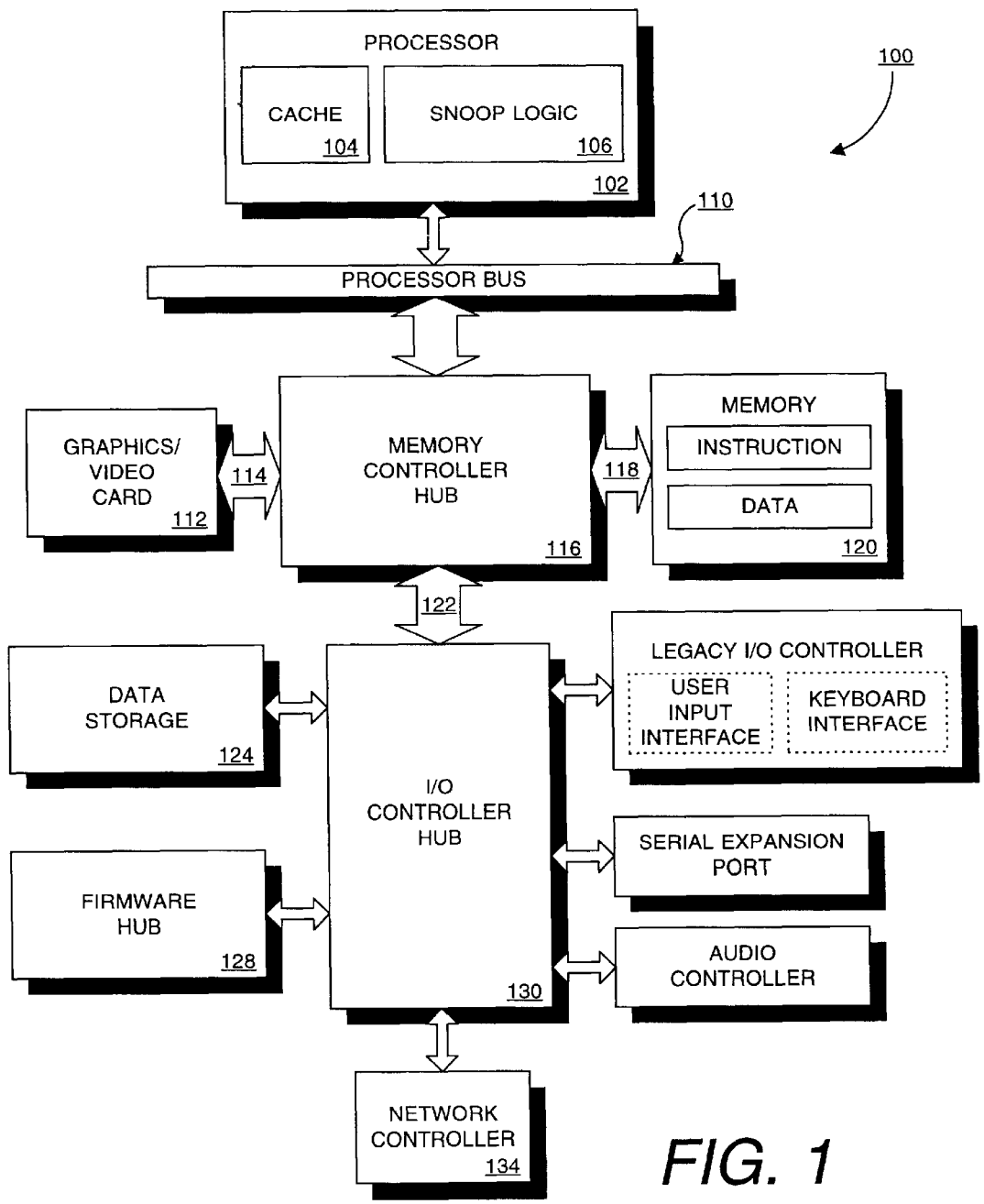
FIG. 1 is a block diagram of one embodiment of a system employing a snoop mechanism.

A method and apparatus for snoop stall reduction on a microprocessor external bus is disclosed. The described architecture enables bus snooping. The embodiments described herein are described in the context of a microprocessor, more particularly an Intel Pentium Pro® microprocessor, but are not so limited. Although the following embodiments are described with reference to microprocessors, other embodiments are applicable to other integrated circuits or logic devices. The same techniques and teachings of the present invention can easily be applied to other types of circuits or semiconductor devices that use bus snooping.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention.

When a processor performs a memory read or write transaction on the processor bus, the other processors must snoop the address in their caches and report the state of their copies to the initiator of the transaction. In order to ensure that a processor's core and other processors that initiate memory bus transactions are always dealing with the latest copy of the information, the processor always snoop memory bus transactions initiated by other processors or agents.

Snooping is performed as follows. First, all transaction requests generated by other initiators are latched. If the snoop controller determines that the latched transaction address is for a cacheable memory range, the latched memory address is presented to the processor's internal caches and request buffers for a lookup. If the targeted line is not present, a miss is indicated as the snoop result during the snoop phase of the transaction by the snoop controller. If the targeted line is present in one or more of the processor's internal caches or request buffers, the processor indicates a snoop hit to the initiator of the transaction in the snoop phase of the transaction.

As cache sizes in a microprocessor increases, the snoop latency from the snoop controller to the cache is translated into snoop stalls on the processor external front side bus. When the snoop result for a transaction is delayed with a snoop stall, subsequent transactions are also delayed. These snoop stalls act as bubbles in a pipeline, throttling the data bandwidth and latency of the processor external bus.

To further negatively impact performance, commonly used graphic intensive instructions, for example movntq, movntps, maskmovq, etc., that were introduced in the Intel Pentium III® processor, cause the processor to perform a lot more self-snoops than in earlier Pentium Pro processor implementations. Snoop stalls on these self-snoops can prevent the system from actually realizing the benefits of the new instruction set.

Embodiments of the present invention can reduce snoop stall on the external bus coupling a processor and other bus agents. Dispatching the snoop probe one bus clock earlier can give the L2 cache an extra bus clock to respond to a snoop, thus decreasing the number of snoop stalls. This decrease in the number of snoop stalls allows an agent on the processor bus to reap benefits of advances in memory technologies and implementations.

Referring now to FIG. 1, a computer system 100 is shown. System 100 includes a component, such as a processor, employing a snoop mechanism in accordance with the present invention, such as the embodiment described herein. System 100 is representative of processing systems based on the PENTIUM® Pro, PENTIUM® II, PENTIUM® III microprocessors available from Intel Corporation of Santa Clara, Calif., although other systems (including PCs having other microprocessors, engineering workstations, set-top boxes and the like) may also be used. In one embodiment, sample system 100 may be executing a version of the WINDOWS™ operating system available from Microsoft Corporation of Redmond, Wash., although other operating systems and graphical user interfaces, for example, may also be used. Thus, the present invention is not limited to any specific combination of hardware circuitry and software.

FIG. 1 is a block diagram of one embodiment of a system 100. System 100 is an example of a hub architecture. The computer system 100 includes a processor 102 that processes data signals. The processor 102 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 1 shows an example of an embodiment of the present invention implemented in a single processor system 100. However, it is understood that other embodiments may alternatively be implemented as systems having multiple processors. Processor 102 is coupled to a processor bus 110 that transmits data signals between processor 102 and other components in the system 100. The elements of system 100 perform their conventional functions well known in the art.

System 100 includes a memory 120. Memory 120 may be a dynamic random access memory (DRAM) device, a static random access memory (SRAM) device, flash memory device, or other memory device. Memory 120 may store instructions and/or data represented by data signals that may be executed by processor 102. A cache memory 104 can reside inside processor 102 that stores data signals stored in memory 120. Alternatively, in another embodiment, the cache memory may reside external to the processor.

Snoop logic 106 also resides in processor 102. Alternate embodiments of a snoop mechanism 106 can also be used in microcontrollers, embedded processors, graphics devices, DSPs, and other types of logic circuits.

A system logic chip 116 is coupled to the processor bus 110 and memory 120. The system logic chip 116 in the illustrated embodiment is a memory controller hub (MCH). The processor 102 communicates to the MCH 116 via a processor bus 110. The MCH 116 provides a high bandwidth memory path 118 to memory 120 for instruction and data storage and for storage of graphics commands, data and textures. The MCH 116 directs data signals between processor 102, memory 120, and other components in the system 100 and bridges the data signals between processor bus 110, memory 120, and system I/O 122. In some embodiments, the system logic chip 116 provides a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices. Some examples are the audio controller, firmware hub (BIOS) 128, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

The present enhancement is not limited to computer systems. Alternative embodiments of the present invention can be used in other devices such as, for example, handheld devices and embedded applications. Some examples of handheld devices include cellular phones, Internet Protocol devices, digital cameras, personal digital assistants (PDAs), and handheld PCs. Embedded applications can include a microcontroller, a digital signal processor (DSP), system on a chip, network computers (NetPC), set-top boxes, network hubs, wide area network (WAN) switches, or any other system which uses a latch type mechanism for other embodiments.

Figure 2A:
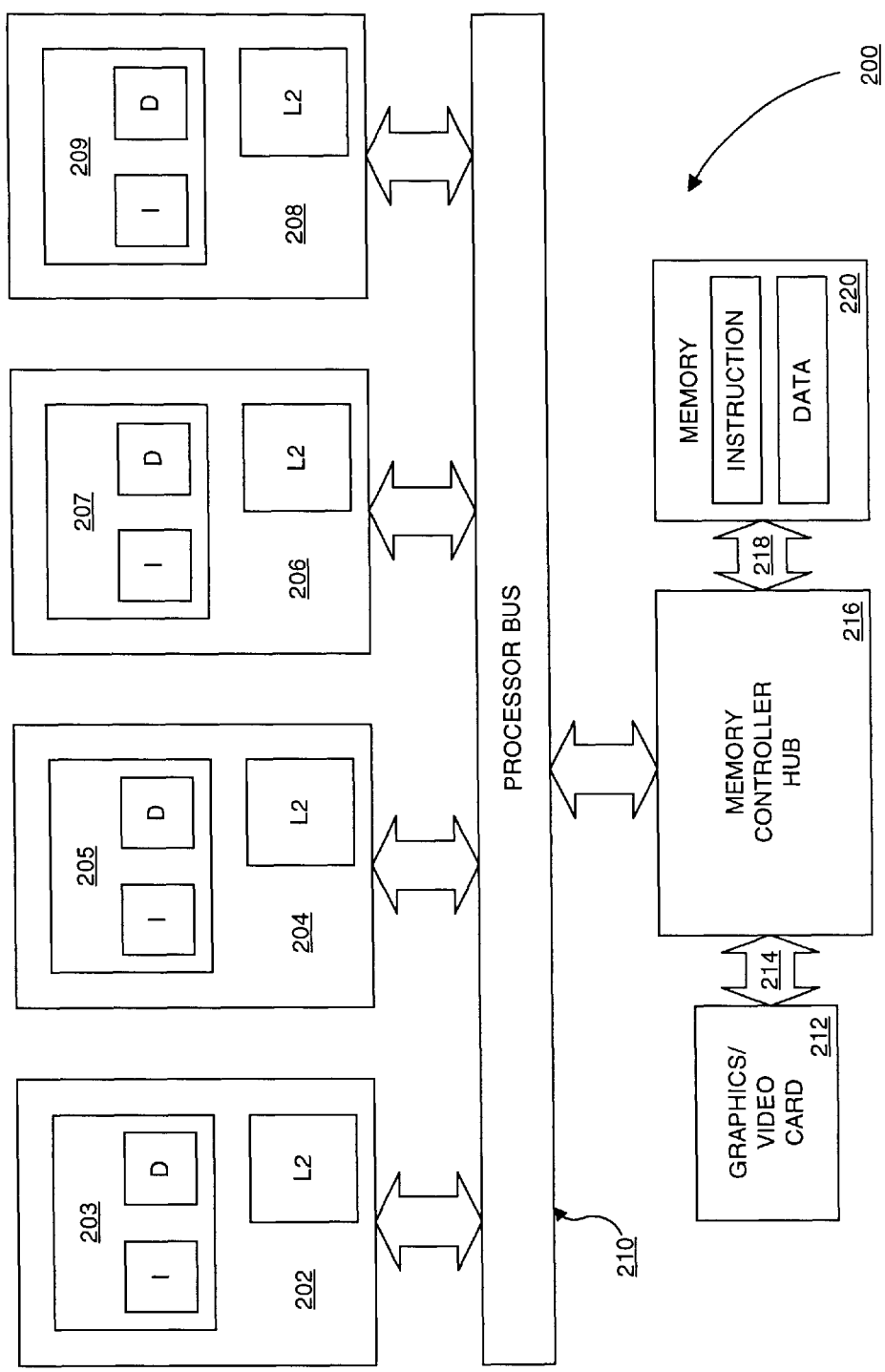
FIG. 2A is a block diagram of one embodiment of a multiprocessor computer system with four processors and a memory controller coupled to a system bus.

FIG. 2A is a block diagram of one embodiment of a multiprocessor computer system 200 with four processors 202, 204, 206, 208 and a memory controller 216 coupled to a system bus 210. Each of these above-identified "agents" is capable of sending and/or receiving data or messages over the system bus 210. Snoop agents are any devices on the bus 210 that have memory caches, usually processors, but, as an example, in addition to the processors there could be an external L3 cache that resides on the bus. A snooping agent is a caching bus agent that observes or snoops bus transactions to maintain cache coherency. The processor external bus 210 is also commonly referred to as a processor front side bus (FSB). The cluster of four microprocessors 202, 204, 206, 208, communicate with each other and other system devices via the processor bus 210. Each microprocessor 202, 204, 206, 208, includes a Level 1 (L1) cache 203, 205, 207, 209 for instructions and data, and a Level 2 (L2) cache.

A memory controller hub 216 is also coupled to the FSB 210. For this embodiment, a memory controller 216 is coupled to a set of dynamic random access memory (DRAM) 220, however other memory devices are foreseeable. An I/O bridge can also be coupled to the processor bus 210. The I/O bridge can provide a communication path between the system bus 210 and a number of peripherals coupled to an I/O bus.

During a snoop phase, all caching agents drive their snoop results and participate in coherency resolution. The agents generate internal snoop requests for all cacheable (snoopable) memory transactions. An agent is also allowed to snoop its own bus requests and participate in the snoop phase along with other bus agents. The processor can snoop its own transactions; this is referred to as self-snooping.

Figure 2B:
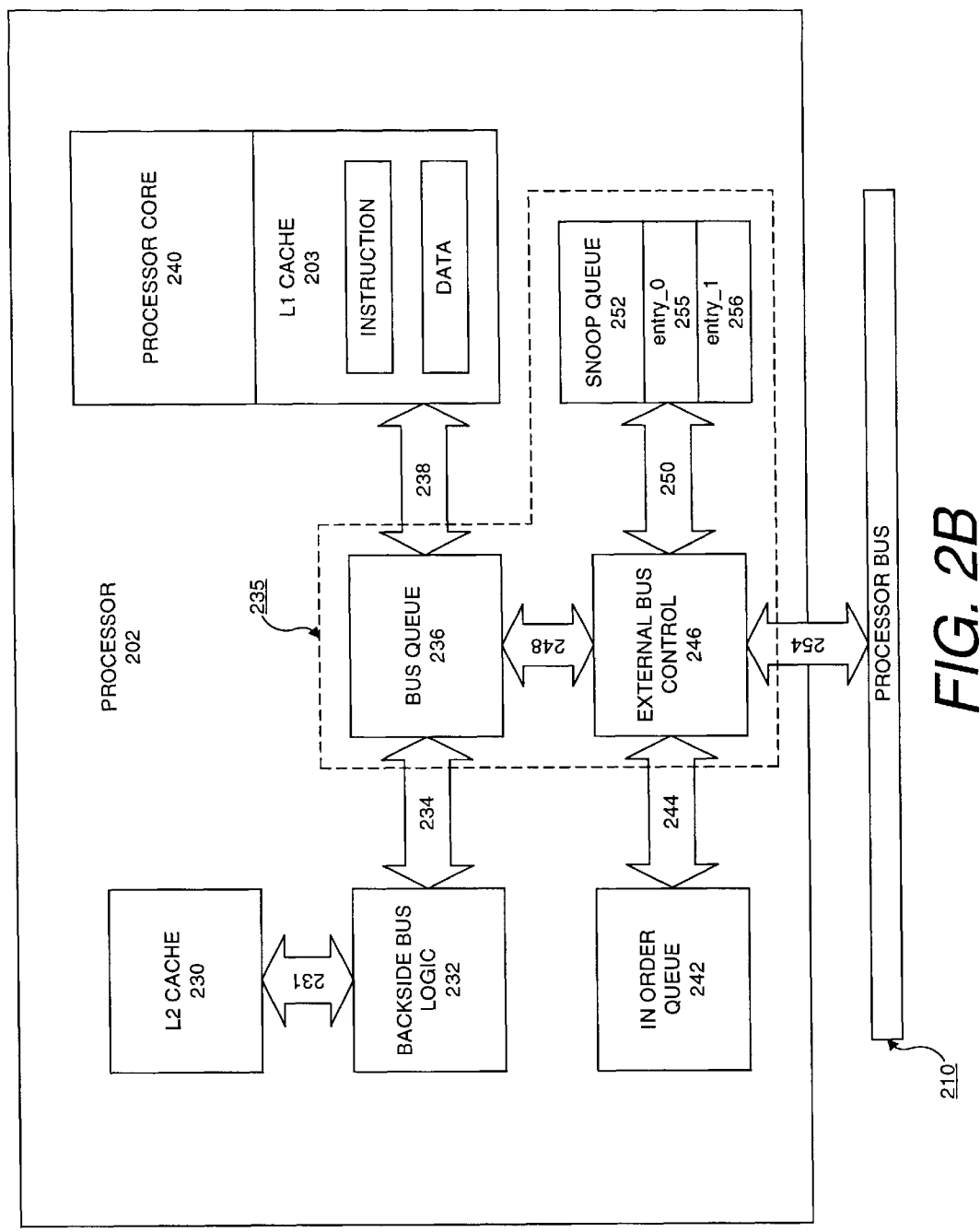
FIG. 2B is a block diagram of one of the microprocessors in FIG. 2A which includes a snoop stall reduction.

FIG. 2B is a block diagram of one of the microprocessors in FIG. 2A which includes a snoop stall reduction. The microprocessor 202 is coupled to system bus 210 via bus 254. The external bus logic (EBL) 235 is comprised of a bus request queue 236, an external bus controller 246, and a snoop queue 252. The snoop queue 252 is coupled to the external bus controller 246 via a bus 250. Bus request queue 236 is coupled to the external bus controller 246 via a bus 248. For this embodiment, the snoop queue 252 is comprised of two entries: entry_0 255 and entry_1 256.

The EBL 235 is coupled to a L1 cache 203 via a bus 238. This L1 cache 203 is divided into a portion for instructions and a portion for data. The L1 cache 203 is coupled to a processor core 240. The EBL 235 is also coupled to a backside bus logic (BBL) 232 via a bus 234. The BBL 232 is coupled to an L2 cache 230 via a bus 231. For one embodiment, the L2 cache 230 is on one die and the BBL 232, EBL 235, L1 cache 203, and processor core 240 are on another die. The two dies are bonded together in the same package.

A snoop request is usually broken down into a snoop probe followed by a snoop confirm. The snoop request is initiated with the processor 202 by issuing a snoop probe to the L1 203, L2 230 caches, and other processor internal request buffers such as the bus request queue. The snoop probe is an internal request seeking to determine whether the L1 203, L2 230 caches, or any of the processor internal request buffers have a copy of the requested line and the status of that line. A snoop confirm is used to change the state of the line and is usually preceded by a snoop probe. A snoop request can take varying amounts of time to complete depending upon the results of the snoop probe and the latency of the caches to the snoop probe.

The snoop queue 252 handles the complexities of maintaining a list of pending snoop requests and their dependencies. The snoop queue 252 maintains strict bus ordering such that all snoop requests are initiated in the same order in which they entered the snoop queue 252. In-order execution of snoop requests is a common method of handling snoop queuing.

Figure 3:
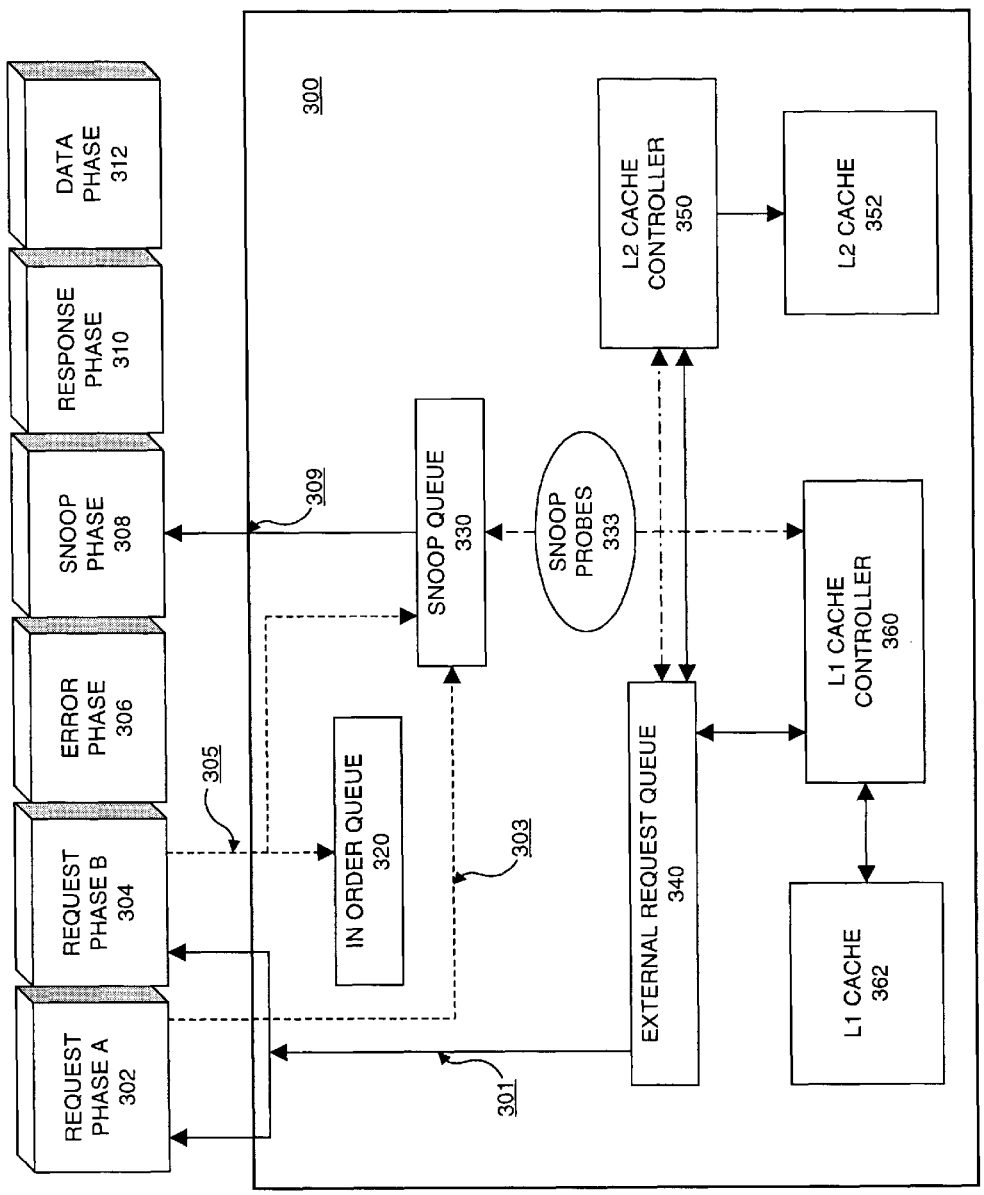
FIG. 3 illustrates the dispatching of snoop probes from a snoop queue for one embodiment.

FIG. 3 illustrates the dispatching of snoop probes from a snoop queue for one embodiment. FIG. 3 shows the dispatching of the snoop probes 333 to the different phases of the Pentium Pro bus protocol. This bus protocol comprises of six phases: arbitration 302, request 304, error 306, snoop 308, response 310, and data 312. Not all transactions contain all phases, and some phases can be overlapped.

External request queue 340 of processor 300 drives an address during Request Phase A 302 and Request Phase B 304. When an address strobe is detected on the processor external bus, the snoop queue 330 latches the transaction address 303 during the first packet 302 of the request phase. During the second packet 304 of request phase, the snoop logic 330 determines if the transaction is snoopable based on the attributes 305 that are part of the second packet 304 of the request phase. For this embodiment, the self snoop attribute 305 in the Request Phase B 304 is latched in both the in order queue 320 and the snoop queue 330. If the transaction is determined to be snoopable during the second packet 304 of the request phase, the snoop controller 330 dispatches snoop probes 333 to all snoopable internal units 340, 350, 352, 360, 362.

When internal units 340, 350, 352, 360, 362, have responded with hit/hit-modified or miss information, the snoop controller 330 stores the information in an internal snoop buffer until the snoop phase 308 of that transaction. The snoop logic 330 drives hit or miss signals 309 appropriately. If the snoop controller 330 does not receive a response from the internal units 340, 350, 352, 360, 362, before the beginning of the snoop phase 308, the processor 300 stalls the front side bus by toggling both hit and miss signals 309 until the internal units 340, 350, 352, 360, 362, respond to the snoop probes 333.

These snoop stalls on the processor external bus are a function of the latency of the response to the snoop probe 333 from the slowest of all the internal units 340, 350, 352, 360, 362. The L2 cache 362 usually has the highest latency amongst the snoopable internal units 340, 350, 352, 360, 362, of the processor 300. As cache sizes increase, this latency is translating to snoop stalls on the processor external bus, throttling the data bandwidth and latency.

One method for decreasing the number of snoop stalls is to dispatch the snoop probe 333 from the snoop logic controller 330 during the first request phase packet 302 itself, as opposed to doing a dispatch in the second request packet 304. As a result, the L2 cache, or the slowest of the snoopable internal units has an extra bus clock to respond to the snoop probe 333. Furthermore, the L2 request buffer also has a wider window for the snoops to queue up, thus reducing the L2 pipeline latency.

The processor snoop controller 330 services external snoops, self-snoops and internal snoops. The external snoops and the self snoops are due to transactions that have been observed on the processor external bus, while the internal snoops (e.g. self-modifying code snoops) are due to transactions that have not yet reached the processor external front side bus. External snoops are in response to external processor bus memory transactions, while self snoops are caused by processor self-generated external bus transactions that have the "self snoop" attribute set. Internal snoops are due to internal events within the microprocessor.

Since all transactions that are not processor self-initiated need to be snooped, all snoops due to external transactions can be dispatched in the first request phase packet 302. The prerequisite for a snoop probe 333 to be dispatched is the address 303 of the transaction which is available in the first request phase packet 302.

For a processor initiated transaction, the self-snoop attributes that are driven during the second request phase 304 packet need to be sampled before the snoop probe can be dispatched. In order for the snoop controller logic to dispatch the snoop probe during the first request phase packet 302, a new self snoop signal called xxselfsnp#, which when asserted during the first packet of the request phase will indicate the self-snoop attribute, needs to be added. For an integrated microprocessor implementing an on chip memory controller, the new signal can be implemented just as a regular internal signal. This enhancement will allow the snoop controller logic to dispatch the snoop probes for both external snoops and self snoops during the first request phase packet itself.

Figure 4:
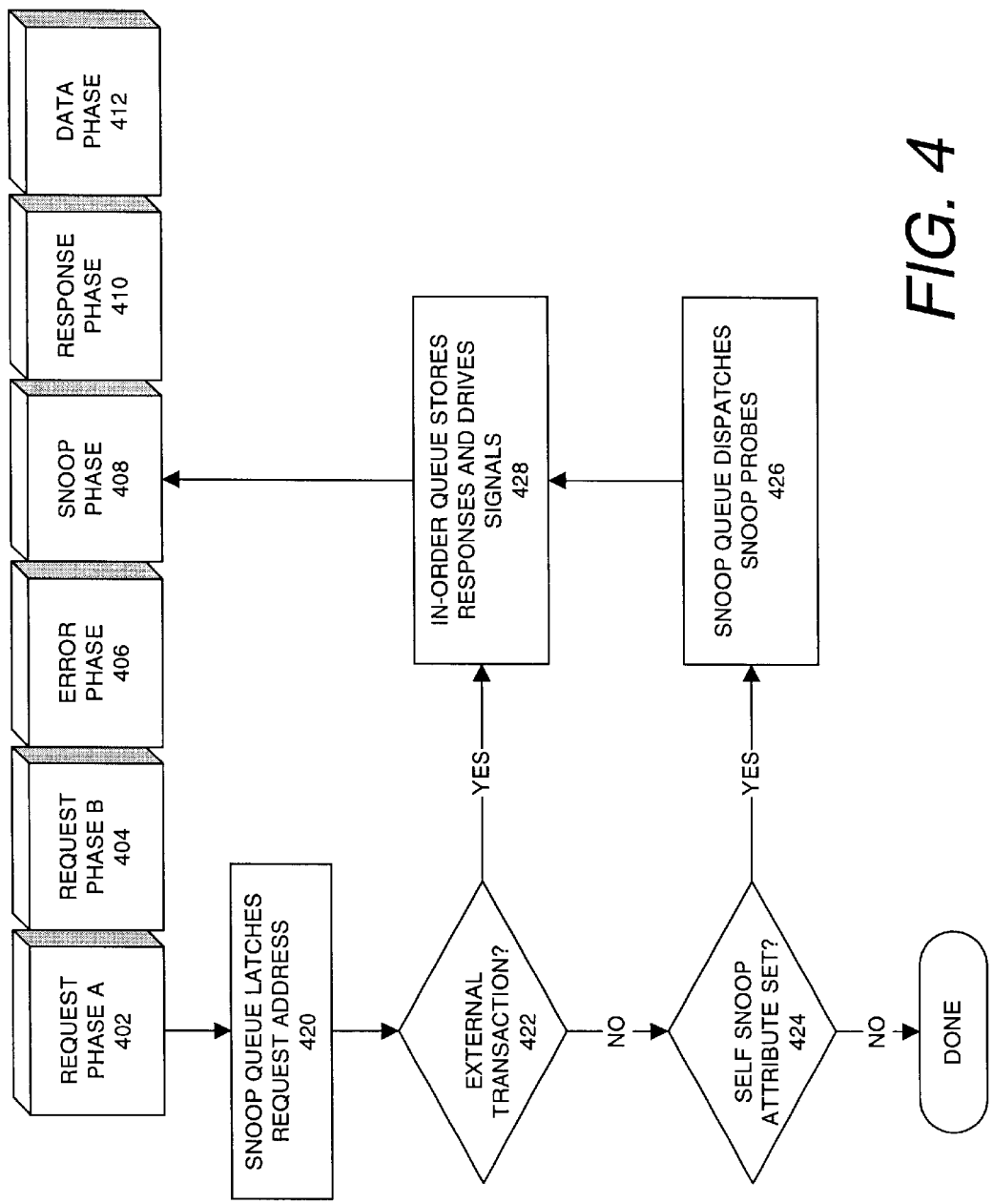
FIG. 4 illustrates the dispatch of snoop probes from a first request packet for one embodiment.

FIG. 4 illustrates the dispatch of snoop probes from a first request packet for one embodiment of the present invention. On observing a Request Phase 402 for a memory access, all caching agents are required to perform an internal snoop operation and appropriately return a hit or miss. The hit or miss results are used to maintain cache coherency at the system level. The Pentium Pro processor and bus support self snooping. Self snooping means that an agent can snoop its own request and drive the snoop result in the snoop phase 408.

During Request Phase A 402, the snoop queue latches the transaction request address at step 420. At step 422, the snoop logic determines whether the transaction is external. If the transaction is external, the in order queue at step 428 stores responses from the snoop probes and drives the hit/miss signals during the snoop phase 408 of the transaction. If the transaction is internal to the processor, the snoop logic checks at step 424 to determine whether the self snoop attribute is set.

The self snoop attribute can be sampled from an external FSB self snoop signal xxselfsnp#. The self snoop attribute can also be bypassed from the external request queue to the snoop queue. If the self snoop attribute is not set, then the process is complete and this transaction does not have to be snooped. But if the self snoop attribute is set, the snoop queue dispatches snoop probes to internal units at step 426. Then the in order queue stores responses and drives signals at step 428 as with an external transaction.

Figure 5:
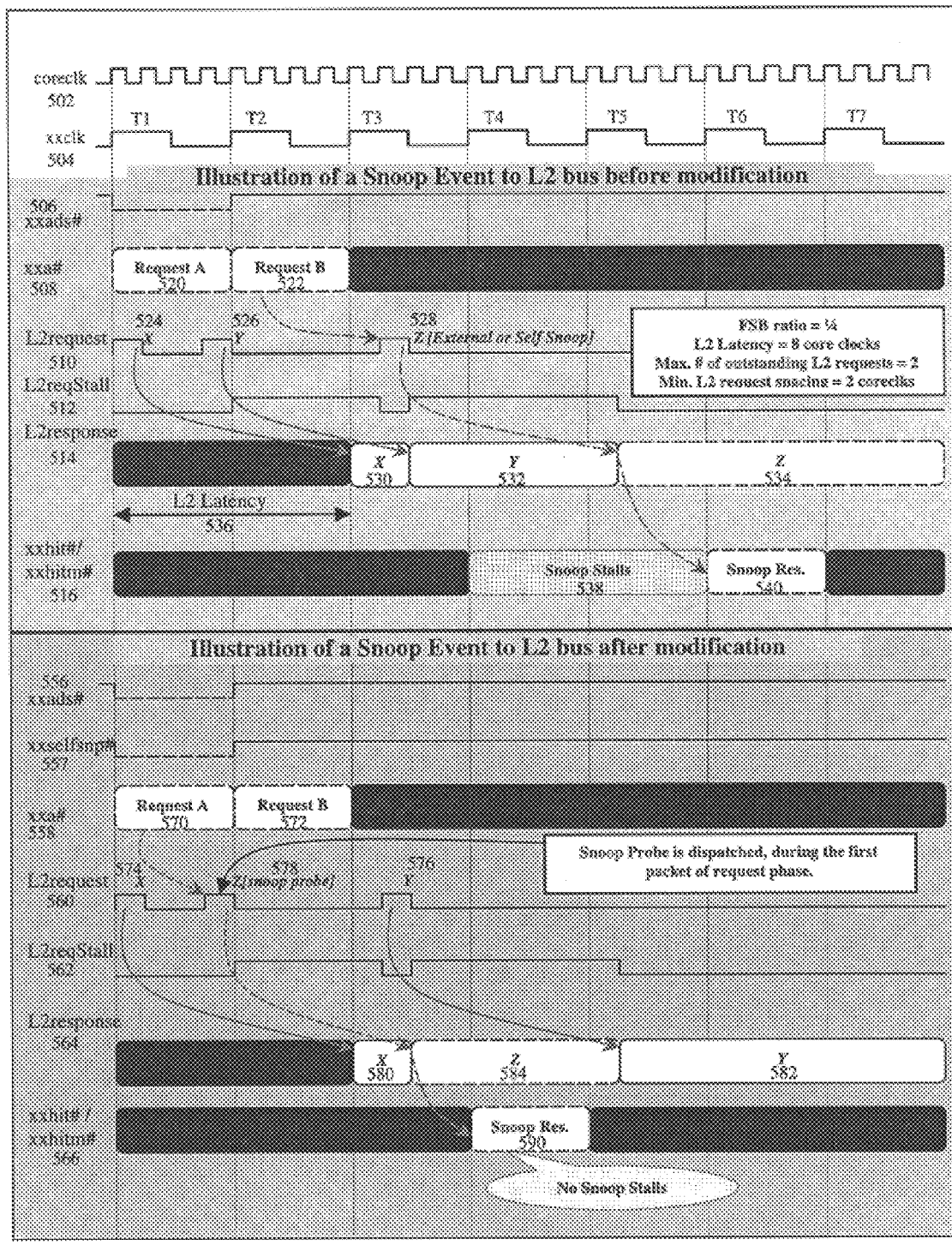
FIG. 5 is an illustrative timing diagram of a snoop event on a system bus.

FIG. 5 is an illustrative timing diagram of a snoop event on a system bus. FIG. 5 shows the dispatching of a snoop probe to an L2 bus in an existing Pentium Pro processor external bus protocol on the upper half of the diagram and the dispatching of a snoop probe in one embodiment of a processor external bus protocol including the present invention. For this example, assume that the L2 latency is eight core clocks, the depth of the L2 request buffer to be two, and the front side bus (FSB) ratio to be 1:4.

Signal coreclk 502 is the internal processor clock signal. Signal xxclk 504 is the external FSB clock. The address strobe signal xxads# 506, 556, is active low. Signals xxa# 508, 558, are address signals. Self snoop signal xxselfsnp# 557 is active low. The xxhit# and xxhitm# signals 515, 566, are snoop-hit and hit-modified signals that indicated the snoop results asserted by a processor bus agent. Internal signals L2request 510, 560, L2reqStall 512, 562, and L2response 514, 564 are coupled to the L2 cache logic.

For this embodiment, if xxhit# and xxhitm# 516, 566, are sampled as asserted together in the snoop phase, it means that a caching agent is not ready to indicate snoop status, and it needs to stall the snoop phase. The snoop signals are sampled two clocks later. The snoop stall is provided to stretch the completion of a snoop as needed by any agent that needs to block further progress of snoops.

The top half of the example in FIG. 5 shows a snoop probe operation on an existing processor external bus protocol. A transaction is the set of bus activities related to a single bus request. A transaction begins with bus arbitration, and the assertion of xxads# 506 and a transaction address. In clock T1, while xxads# 506 is asserted on the FSB, Request A 520 and Request B 522 are asserted on xxa# 508. The L2 controller logic dispatches two L2 requests X 524 and Y 526 to the L2 cache. Since the L2 request buffer is full, the L2reqstall signal 512 prevents any more requests to the L2 cache until one of the earlier requests finishes. In clock T2, the snoop controller logic is ready to dispatch the snoop probe to the L2, but cannot do so because the L2 request buffer is full. It is not until clock T3 when the snoop probe, Z 528 gets dispatched to the L2 cache. The L2 cache responds to the snoop probe in clock T5 and the snoop controller logic drives the snoop data 540 in clock T6. In this example, the snoop controller logic stalls 538 the FSB for two bus clocks.

The bottom half of the example in FIG. 5 shows the same snoop probe operation on an processor external bus protocol including on embodiment of the present invention. In clock T1, xxads# 556 is asserted. But unlike the prior protocol, the snoop controller logic dispatches the snoop probe Z 578 in clock T1 before the second L2 request Y 576. This action results in the snoop controller driving the snoop result 590 in clock T4 without having a snoop stalls.

FIG. 6 is a graph illustrating data bus bandwidth 610 versus lead-off latency 620 on the processor external bus of typical microprocessor. FIG. 6 shows that the data bandwidth 610 tends to decrease as the lead-off latency 620 increases. The average loss in data bus bandwidth after a lead-off latency of ten bus clocks is ~25 megabytes/sec for a Pentium Pro microprocessor. Hence, a two bus clock snoop stall could potentially result in a reduction of the data bus bandwidth by ~50 megabytes/sec.

One embodiment of a processor external bus protocol including the present invention will decrease the number of snoop stalls on the processor external bus. The snoopable internal units within the microprocessor will have an extra bus clock for them to respond to snoop probes from the snoop controller. The change can be achieved with minimal die size area impact. Furthermore, only one new signal needs to be added to the processor external bus pins for an non-integrated microprocessor or an additional internal signal for an integrated microprocessor.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method comprising:
   retrieving an address and a transaction attribute for a bus transaction during a first of a plurality of request phase packets of said bus transaction;
   determining whether said bus transaction is a snoopable memory transaction; and
   dispatching a snoop probe during said first request phase packets if said bus transaction is a snoopable memory transaction.

2. The method of claim 1 further comprising determining whether said bus transaction is an external transaction.

3. The method of claim 1 further comprising determining whether a self snoop attribute is set.

4. The method of claim 1 wherein said snoop probe is dispatched to an internal cache and a snoopable internal request buffer.

5. The method of claim 1 further comprising responding with snoop results during a snoop phase.

6. The method of claim 1 wherein said snoopable memory transaction is self initiated.

7. The method of claim 1 wherein said snoopable memory transaction is generated by an external agent.

8. An apparatus comprising:
- snoop logic coupled to an external processor bus, said snoop logic to issue a snoop probe during a first of a plurality of request phase packets of a snoopable memory transaction;
- a first snoopable internal unit coupled to said snoop logic, said first snoopable internal unit to receive said snoop probe.

9. The apparatus of claim 8 wherein said first snoopable internal unit is a highest level cache.

10. The apparatus of claim 8 further comprising a second snoopable internal unit.

11. The apparatus of claim 10 wherein said second snoopable internal unit is an external request queue.

12. The apparatus of claim 10 wherein said second snoopable internal unit is a lower level of cache.

13. The apparatus of claim 8 wherein said snoop probe is dispatched to an internal cache and a snoopable internal request buffer.

14. The apparatus of claim 8 wherein said snoop logic further comprises a snoop queue and logic to drive a snoop result to said external processor bus.

15. The apparatus of claim 8 wherein said external processor bus is further coupled to a second caching agent.

16. An integrated circuit device comprising:
- a bus interface coupled to an external processor bus;
- an external request queue coupled to said bus, said external request queue to drive a transaction address onto said bus;
- snoop logic coupled to said bus, said snoop logic to issue a snoop probe during a first of a plurality of request phase packets of a snoopable memory transaction; and
- a first snoopable internal unit coupled to said snoop logic, said first snoopable internal unit to receive said snoop probe.

17. The integrated circuit device of claim 16 further comprising a self snoop signal to indicate a self generated external bus transaction and to cause said snoop logic to dispatch said snoop probe during said first request phase packet.

18. The integrated circuit device of claim 16 wherein said first snoopable internal unit is a highest level cache.

19. The integrated circuit device of claim 16 further comprising a second snoopable internal unit.

20. The integrated circuit device of claim 19 wherein said second snoopable internal unit is a lower level cache.

21. The integrated circuit device of claim 16 wherein said snoop logic further comprises circuitry to drive a snoop result to said external processor bus.

22. The integrated circuit device of claim 16 wherein said integrated circuit device is a microprocessor.

23. A system comprising:
- a first caching agent coupled to a bus, said first caching agent to initiate a snoopable memory transaction on said bus;
- a second caching agent couple to said bus, said second caching agent comprising:
  - snoop logic coupled to said bus, said snoop logic to issue a snoop probe during a first of a plurality of request phase packets of said snoopable memory transaction; and
  - a first snoopable internal unit coupled to said snoop logic, said first snoopable internal unit to receive said snoop probe.

24. The system of claim 23 wherein said bus is a processor front side bus.

25. The system of claim 23 wherein said first caching agent is microprocessor.

26. The system of claim 23 wherein said first caching agent is a memory controller.

27. The system of claim 23 wherein said second caching agent is a microprocessor.

28. The system of claim 23 wherein said first caching agent further comprises an external request queue coupled to said bus, said external request queue to drive a transaction address onto said bus.

29. The system of claim 23 wherein said first snoopable internal unit is a first level cache.

30. The system of claim 23 wherein said second caching agent further comprises a self snoop signal to indicate a self generated external bus transaction and to cause said snoop logic to dispatch said snoop probe during said first request phase packet of a snoopable memory transaction.

31. A method comprising:
- detecting an address strobe during a request phase for an external bus transaction, wherein in response to said address strobe, a transaction address in a first of a plurality of request packets of said request phase is acquired;
- determining whether a self snoop attribute is associated with said first request packet; and
- initiating a snoop of a internal memory.

32. The method of claim 31 further comprising dispatching a snoop probe to said internal memory in response to detection of said self snoop attribute.

33. The method of claim 32 wherein said internal memory is a processor cache.

34. The method of claim 33 wherein said self snoop attribute is communicated via a self snoop signal during transmission of said first request packet.

35. The method of claim 34 wherein said internal memory in response to said snoop, determines whether said transaction address results in a hit or a miss.

36. An apparatus comprising:
- snoop logic to detect an address strobe during communication of a first of a plurality of request packets for a request phase of a bus transaction, wherein said snoop logic in response to detection of said address strobe is to acquire a transaction address from said first request packet; and
- a snoop queue coupled to said snoop logic, said snoop queue to dispatch a snoop probe to a memory internal to said apparatus if a self snoop signal is detected as being associated with said first request packet.

37. The apparatus of claim 36 wherein said memory is a cache memory.

38. The apparatus of claim 36 further comprising a bus unit coupled to said snoop logic, said bus unit to control communication of address and data on a bus, wherein said bus unit is to communicate said first request packet onto a system bus.

39. The apparatus of claim 38 wherein said memory is to communicate a snoop result to said snoop logic in response to said snoop probe.

40. The apparatus of claim 36 wherein said apparatus is a processor.

41. A system comprising:
- a first caching agent coupled to a bus, said first caching agent to receive a transaction on said bus; and
- a second caching agent couple to said bus, said second caching agent to initiate and snoop transactions on said bus, said second caching agent comprising:

snoop logic to detect an address strobe during communication of a first of a plurality of request packets for a request phase of a bus transaction, wherein said snoop logic in response to detection of said address strobe is to acquire a transaction address from said first request packet; and a snoop queue coupled to said snoop logic, said snoop queue to dispatch a snoop probe to a memory internal to said second caching agent if a self snoop signal is detected as being associated with said first request packet.

42. The system of claim 41 wherein said bus transaction is initiated by said second caching agent.

43. The system of claim 42 wherein said memory is a cache memory.

44. The system of claim 42 wherein said second caching agent further comprises a bus unit coupled to said snoop logic, said bus unit to control communication of address and data between said second caching agent and said bus, wherein said bus unit is to communicate said first request packet onto said bus.

45. The system of claim 44 wherein said memory is to communicate a result indicating a hit or a miss to said snoop logic in response to said snoop probe.

46. The system of claim 42 wherein said first caching agent and said second caching agent are respectively a first processor and a second processor.

* * * * *